United States Patent [19]
Petrushka

[11] 3,860,200
[45] Jan. 14, 1975

[54] AIRFOIL
[75] Inventor: Edward M. Petrushka, Westerville, Ohio
[73] Assignee: Rockwell International Corporation, Pittsburgh, Pa.
[22] Filed: Sept. 5, 1973
[21] Appl. No.: 394,581

[52] U.S. Cl............................ 244/42 CC, 244/12 R
[51] Int. Cl............................................. B64c 3/38
[58] Field of Search......... 244/42 CD, 42 CC, 12 R, 244/12 B, 45 A, 52

[56] References Cited
UNITED STATES PATENTS
| | | | |
|---|---|---|---|
| 2,922,277 | 1/1960 | Bertin | 244/42 CC |
| 3,045,947 | 7/1962 | Bertin et al. | 244/52 |
| 3,545,701 | 12/1970 | Bertin | 244/12 B |
| 3,664,611 | 5/1972 | Harris | 244/42 CD |

Primary Examiner—Trygve M. Blix
Assistant Examiner—Charles E. Frankfort

[57] ABSTRACT

An airfoil for an aircraft system is provided with a pair of airfoil-like primary fluid flow injectors that are rotatable relative to airfoil structure and to positions that develop aerodynamic lift in conventional flight and fluid-reaction lift in vertical/hovering/transitional flight. An actuator connected to the aft airfoil-like injector functions to selectively rotate such injector to positions whereat the injector trailing edge comprises a part of the airfoil cross-sectional profile associated with aircraft system attitude-stabilized flight, is positioned above such profile to reduce airfoil camber and associated aerodynamic lift, or is projected below such profile to define, in combination with the other airfoil-like injector, a lift ejector diffuser section.

4 Claims, 23 Drawing Figures

PATENTED JAN 14 1975

AIRFOIL

SUMMARY OF THE INVENTION

An aircraft system having both a principal power plant which produces high-energy primary flow fluid and a fuselage is provided with attached, fixed aerodynamic lift-producing airfoils constructed and operated in accordance with this invention. Each such airfoil includes a lift ejector assembly comprised of an airfoil-shaped after injector flap member, a forward injector flap member which is spaced apart from but operated in combination with the after injector flap member in modes of flight operation other than conventional flight, and means conducting high-energy primary flow fluid from the system principal power plant to a Coanda-blowing slot means in each system injector flap member at least during non-conventional modes of system flight. Pilot-operated actuator means are provided in the system for controlling thrust vector orientation and for varying the divergence angles of the diffuser sections defined by the flap members in each lift ejector by coordinated actuation and rotation to thereby vary system collective lift and also longitudinal, lateral, and directional attitudes selectively during vertical, hovering, and transitional flight. On actuation of the airfoil forward flap members to a stowed or fully-faired position suitable for a conventional or cruise mode of flight operation the injector after flap members may be selectively positioned to effect changes in airfoil camber and correlated changes in system longitudinal and lateral attitudes by means of the included, connected actuators. In alternate embodiments of the invention one or more core injectors essentially centered between the forward and after injector flap members also cooperate with the system power plant in selective fluid-receiving relation.

DETAILED DESCRIPTION

Figure 1:
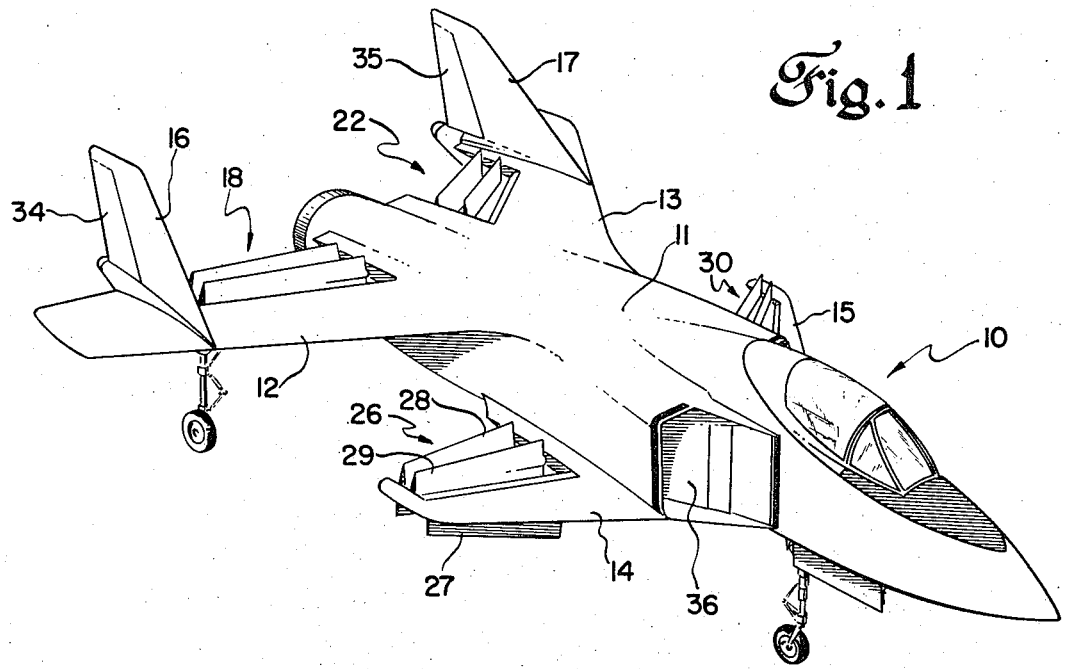
FIG. 1 is a perspective view of an aircraft system utilizing the airfoil construction invention of this application in a vertical ascent/descent or hovering mode of flight operation.

FIG. 1 of the drawings is a perspective view of an aircraft system 10 in which the airfoil construction invention claimed in this application is embodied. Such aircraft system is illustrated in its operating configuration for either vertical ascent/descent or hovering flight. Additionally, aircraft system 10 has a capability for a conventional flight mode of operation and a capability for effecting transition between its vertical/hovering flight and conventional flight modes of operation. As shown in the drawings, aircraft system 10 has a fuselage 11 and also has right and left wing airfoils 12 and 13 fixedly attached to fuselage 11. Such airfoils develop the system's principal aerodynamic lift forces during the conventional flight mode of operation. Aircraft system 10 also includes right and left canard airfoils 14 and 15 fixedly attached to fuselage 11 forward of wing airfoils 12 and 13 and also forward of the aircraft system center of gravity. Such canard airfoils are provided for developing aerodynamic lift forces for attitude stabilization and for attitude change control purposes during conventional forward flight. In addition, aircraft system 10 further includes right and left vertical stabilizer airfoils 16 and 17 supported by wing airfoils 12 and 13 in a conventional manner.

For purposes of developing a system vertical flight operating capability, including capabilities for hovering and for achieving transition from a vertical flight mode of operation to a conventional flight mode of operation, and also for purposes of developing fuselage attitude control during all modes of flight, airfoils 12 through 15 are each provided with a hereinafter more-specifically described lift ejector assembly. The lift ejector assembly provided in wing airfoil 12 is referenced by the numeral 18 and is basically comprised of a forward injector flap member 19, an after injector flap member 20, and a center panel injector member 21. See FIG. 2. The additional lift ejector assemblies included in aircraft system 10 are referenced in FIG. 2 and elsewhere in the drawings as 22 in the left wing airfoil 13, as 26 in right canard airfoil 14, and as 30 in left canard airfoil 15. Lift ejector assembly 22 is comprised of forward injector flap member 23, after injector flap member 24, and center injector panel member 25. Lift ejector assembly 26, as shown in the drawings, is comprised of forward injector flap member 27, after injector flap member 28, and center injector panel member 29. Similarly, left canard lift ejector assembly 30 is basically comprised of forward injector flap member 31, after injector flap member 32, and center injector panel member 33. System 10 further includes conventional right and left rudder control surfaces 34 and 35 provided in vertical stabilizers 16 and 17, respectively. Air inlet opening 36 shown in FIG. 1 is a part of the aircraft system principal power plant subsystem 37 illustrated schematically in FIG. 2.

Figure 2:
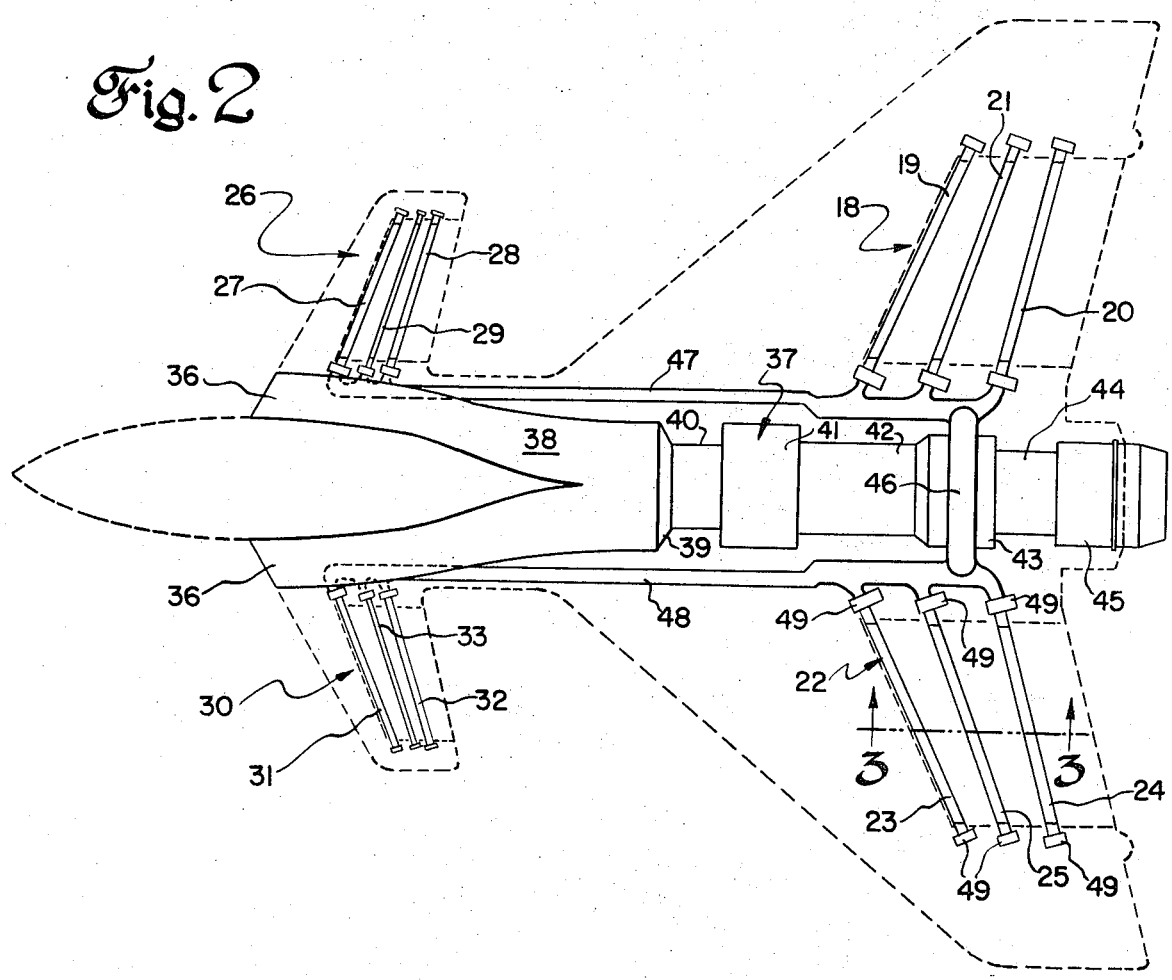
FIG. 2 is a planview schematically illustrating the combined lift ejector assemblies and principal power plant subsystem included in the FIG. 1 aircraft system.

Referring to FIG. 2, power plant subsystem 37 further includes branched inlet ducting 38 cooperating with inlet openings 36, engine inlet section 39, a compressor section 40, a combustion section 41, a turbine section 42, a diverter section 43, an afterburner section 44, and a nozzle section 45. The exact form of principal power plant subsystem 37 is not critical to the claimed invention except that such subsystem must provide an adequate supply of high-energy fluid for utilization in lift ejector assemblies 18, 22, 26 and 30 incorporated in the aircraft system airfoils, as well as develop those thrust forces necessary for forward propulsion of system 10 during conventional flight operation. High-energy fluid extracted from propulsion subsystem 37 at the shroud means designated 46 is proportioned and distributed to the different lift ejector assemblies by means of distribution duct assemblies 47 and 48. In other embodiments of the aircraft system 10, principal propulsion subsystem 37 may alternatively include a high bypass ratio turbofan engine rather than the turbojet engine illustrated schematically in the drawings. Also, FIG. 2 schematically illustrates bearing supports 49 provided at the inboard and outboard ends of each system ejector assembly flap or panel member to facilitate rotation of such members relative to supporting fuselage structure during utilization of the invention.

Figure 3:
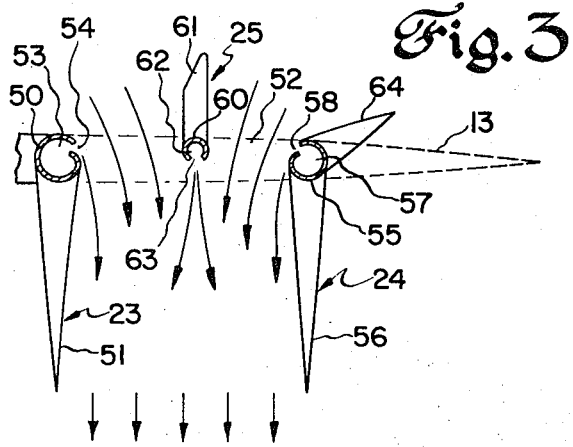
FIG. 3 is a schematic cross-sectional view taken at line 3—3 of FIG. 2.

FIG. 3 schematically illustrates a representative construction of the lift ejector assembly provided in each of the airfoils of aircraft system 10. Such lift ejector assembly, designated 22 in FIG. includes basically incudes a forward injector flap member 23, an after injector flap member 24, and a center or core injector panel member 25. Flap member 23 is an assembly essentially comprised of hereinafter described straight-line injector means 50 in combination with an attached airfoil-shaped panel 51 that provides for proper closure of airfoil ejector opening 52 at the underside of representative airfoil 13 during conventional flight and that functions to in-part define the diffuser section of lift ejector 22 in vertical, hovering, and transitional modes of aircraft system operation. Straight-line injector means 50 is essentially a tubular member with interior passageway 53 and with a cooperating slot 54 that each extend essentially throughout the assembly length. After injector flap member 24 also includes a straight-line injector means, designated 55 and located oppostie similar means 50, and an attached airfoil-shaped panel. It is preferred that panel 56 have a cross-sectional configuration or shape whose upper and lower surfaces comprise a continuation of the adjacent contoured upper and lower surfaces of the airfoil 13 in which it is installed. Thus, and in its conventional flight positions, panel 56 throughout its span comprises an airfoil movable trailing edge. Panel 56 functions in the manner of a flap/aileron during operation of aircraft system 10 in conventional flight. In the vertical, hovering, and transitional modes of flight operation of aircraft system 10, however, flap member 24 functions in combination with the other component parts of assembly 22 and provides part definition of the diffuser section of lift ejector assembly 22. Injector means 55, like means 50, is essentially a tube-like member havng interior passageway 57 and slot 58 extending throughout its length. Forward and after injector flap members 23 and 24 are normally actuated independently but in a coordinated manner by suitable actuator means as hereinafter described. An additional and separately actuated streamlined panel member 64 may be attached to and supported in assembly 24 by injector means 55 for the hereinafter mentioned closure purposes.

Figure 6:
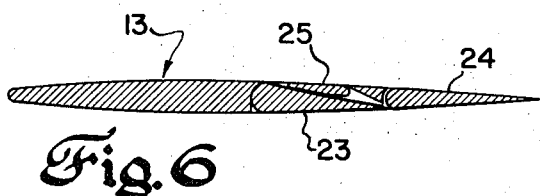

Center injector panel member 25 is comprised of a core injector means 60 in combination with an attached fairing 61 of conventional construction. Injector means 60 is as in the case of injector means 50 or 55, a tube-like member with an interior passageway 62 and a nozzle or slot opening 63 extending essentially throughout its length. Member 25 normally is rotated in coordination with but independently of flap members 23 and 24. In some instances, however, center panel member 25 may preferably be rotationally driven through a suitable linkage or gearing connection (not shown) to forward flap member 23. Panel 61, in combination with previously mentioned panel 64 functions to provide closure for the system ejector secondary fluid flow induction opening 52 at the upper surface of airfoil 13 during the course of conventional flight operation of aircraft system 10. Airfoil-shaped panel 51 provides for opening closure at the under surface of airfoil 13 in its conventional flight configuration. See FIG. 6.

High-energy fluid, normally in the form of the gaseous products of combustion of power plant subsystem 37, is delivered during system 10 nonconventional modes of flight operation by means of distribution ducting 47, 48, from at or after the turbine section 42 of propulsion subsystem 37 and preferably at a pressure ratio of approximately 1.3 or greater, to the interior passageways 53 and 57 of Coanda injector means 50 and 55 and to the interior passageway 62 of center (core) injector assembly 60 of each system lift ejector assembly. Distribution ducting 47, 48 is normally sized to minimize fluid flow energy losses and to achieve duct flow velocities of about 0.25 Mach typically to as great as approximately 0.4 Mach. The pressurized high-energy ejector primary fluid flowed to all system flap assemblies 23, 24, and 25 or their equivalents is proportioned so that approximately 30% to 70% of the total flow to each lift ejector assembly is distributed to core injector 60 and discharged through nozzle opening 63. The balance directed to each such airfoil lift ejector is divided between and distributed to injector members 50 and 55 for discharge from slots 54 and 58 in opposite directions generally toward core injector assembly 25. Such opposite directions are essentially at right angles to the direction of fluid flow through the lift ejector assembly 22 and to the direction of vector orientation of the fluid-reaction lift developed for vertical, hovering, or transitional flight. Gaseous fluids are discharged through slot and nozzle openings 53, 58, and 63 in each ejector assembly preferably at a velocity of at least approximately 0.7 Mach to as high as 1.0 Mach or slightly greater. Nozzle opening 63 is located adjacent or slightly above the plane of the throat section of ejector assembly 22 in the vertical flight operating configuration. Operation of typical forward and after injector flap members 23 and 24 in combination with core injector 25 and received high-energy fluid from the aircraft system principal power plant is effective to produce thrust augmentation ratios in each lift ejector 18, 22, etc. to as high as at least approximately 1.6 under preferred operating conditions.

It should be noted that the different lift ejectors incorporated in aircraft system 10 in accordance with this invention are each preferably located within the incorporating airfoil planform in a manner whereby the fluid-reaction thrust vectors associated therewith, particularly in the vertical flight mode of system operation, substantially pass along and through the line of sectional centers of pressure or centers of lift for such airfoil in conventional, aerodynamic lift-producing cruise flight. Such arrangements minimize the introduction of adverse pitching moments into the system airframe, especially during the transitional mode of flight operation.

Figure 8:
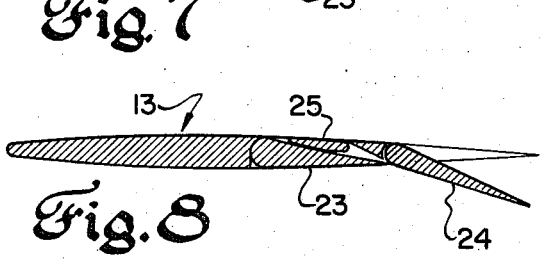

FIGS. 4 through 8 schematically illustrate the typical cross-sectional configurations of airfoil 13 for representative vertical/hovering, transitional, and conventional modes of flight operation, respectively. The FIG. 4 airfoil configuration is for the vertical ascent/descent and hovering modes of flight operation in which the lift ejector diffuser section typically formed by injector flap members 23 and 24 has a principal longitudinal axis 67 oriented in a vertical flight reference direction. By the hereinafter described pilot-operated control means, the injector flap members of airfoil 13 may be operated in combination with center core injector assembly 25 to the FIG. 5 airfoil configuration whereby axis 68 of the lift ejector assembly is oriented for transitional flight. In the FIG. 5 configuration, high-energy primary flow fluid is injected into the lift ejector from injector assemblies 23, 24, and 25, and secondary flow fluid (air) is entrained in the primary flow fluid from above the airfoil upper surface as in the case of the FIG. 4 airfoil configuration to develop improved thrust augmentation and total fluid-reaction lift. For conventional cruise modes of flight operation the control apparatus of this invention is operated to position injector flap members 23, 24 and center injector panel member 25 in the FIG. 6 typical airfoil configuration. In the FIG. 6 configuration conventional aerodynamic lift forces are developed at airfoil 13 as a result of forward cruise flight resulting from normal propulsion forces being applied to fuselage 11 by the system primary power plant 37. The FIG. 7 configuration of airfoil 13 is similar to the FIG. 6 configuration except that by means of the hereinafterdescribed cooperating actuator after flap member 24 has been rotated independently of flap member 23 and center injector 25 to a position which is effective to reduce the camber of airfoil assembly 13. Such reduction in airfoil camber develops reduced aerodynamic lift at airfoil means 13 during conventional cruise flight and is effective to achieve fuselage attitude changes as in connection with roll and pitch maneuvers. FIG. 8 also is similar to FIG. 6 except that after flap member 24 is rotated by the hereinafter-described actuator means to a position which is effective to significantly increase the camber of airfoil assembly 13. In the FIG. 8 configuration, rotated after flap member 24 causes an increase in the aerodynamic lift developed at airfoil 13 and also is effective to accomplish aircraft attitude changes. Thus, after flap member 24 in the FIGS. 6 through 8 configurations functions in the manner of a conventional aileron or elevon control surface, such function being in addition to the FIGS. 4 and 5 functions wherein member 24 in part defines a lift ejector assembly diffuser section.

Figure 9:
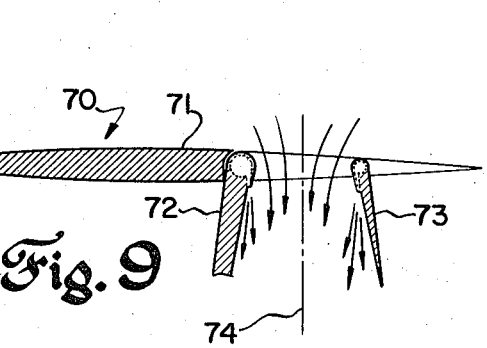
FIGS. 9 through 13 are similar to FIGS. 4 through 8 respectively but illustrate an alternate embodiment of the FIG. 1 aircraft system airfoils for different typical vertical flight, transitional flight, and conventional cruise flight modes of operation.
Figure 4:
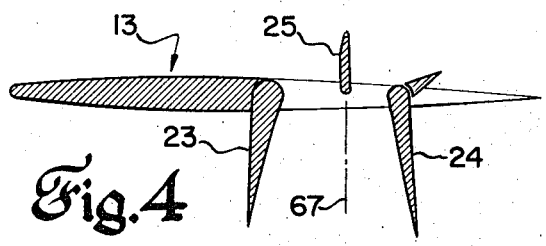
FIGS. 4, 5, and 6 are schematic cross-sectional views illustrating a representative FIG. 1 aircraft system airfoil in vertical flight, transitional flight, and conventional cruise flight mode configurations, respectively.
Figure 10:
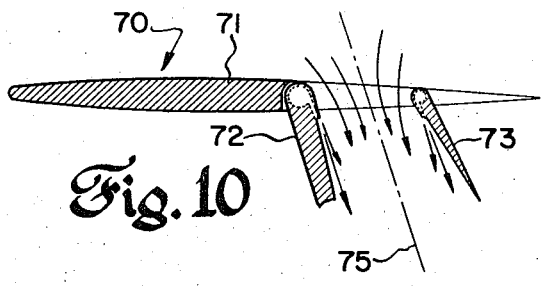
Figure 5:
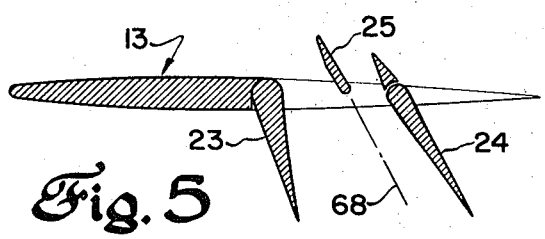
Figure 11:
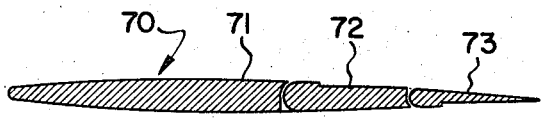
Figure 12:
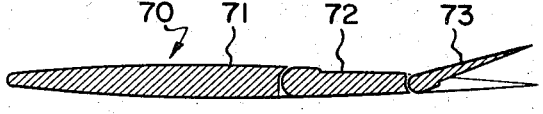
Figure 7:
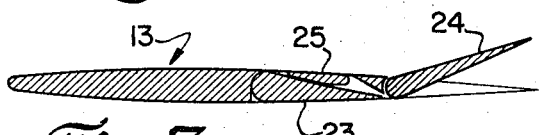
FIGS. 7 and 8 are similar to FIGS. 4 through 6 but the preferred airfoil construction with the included after flap member at airfoil camber decreasing and increasing positions respectively for varying aerodynamic lift during cruise flight.
Figure 13:

FIGS. 9 through 13 are generally similar to FIGS. 4 through 8 except that an alternate airfoil construction embodiment is disclosed. Such alternate airfoil is referenced in the drawings generally by the reference numeral 70. As shown in such figures, airfoil 70 is essentially comprised in cross-section of a forward fixed portion 71 of aerodynamic profile and of forward and after injector flap members 72 and 73 respectively. No center injector comparable to assembly 25 of FIG. 3 is included in the alternate embodiment. As shown in FIG. 9, flap members 72 and 73 are rotated to an essentially vertical orientation and in that orientation define a lift ejector diffuser section whose principal axis 74 is oriented in a flight reference direction for vertical takeoff/landing flight operations or for aircraft hovering. In the FIG. 10 illustration both of flap members 72 and 73 have been rotated clockwise by cooperating actuator means to orient lift ejector thrust vector axis 75 in a direction typical of aircraft flight in a transitional mode of flight operation. FIG. 11 illustrates alternate embodiment 70 in its fully streamlined configuration as in the case of conventional level cruise flight operation. In the FIG. 12 illustration, after flap member 73 is rotated by the hereinafter-described actuator means to a position which is effective to reduce the camber of airfoil assembly 70 to thereby develop correspondingly reduced aerodynamic lift at the airfoil. In the FIG. 13 configuration, after flap member 73 is rotated to a position which is effective to increase the camber of airfoil assembly 70 and thereby produce a correlated increase in aerodynamic lift. Such decrease or increase in aerodynamic lift is useful in connection with aircraft attitude maneuvering durng conventional cruise flight. In both basic arrangements shown in FIGS. 4 through 13, after flap member 24 or 73 in each type of novel aircraft system airfoil may be rotated to the FIG. 8/FIG. 13 condition to provide aerodynamic lift augmentation at all or selected laterally opposed airfoils in the aircraft system 10. In the total lift augmenting conditions involving FIGS. 8 and 13 configurations, injector members 24 and 73 essentially additionally function in the manner of conventional aircraft flaps.

It is important that the airfoil of this invention have the included lift ejector injectors installed in a manner whereby the after injector flap member (24, FIG. 4 or 73, FIG. 9) comprises the aftmost portion of the desired airfoil plan and sectional profiles in its conventional flight fully faired or centered position. In typical airfoil applications such as a wing airfoil that develops principal aerodynamic lift during conventional or cruise flight operation, that portion of the airfoil chordwise cross-sectional profile comprised of injector flap members 23 and 24 and center panel member 25 as in the FIGS. 3 through 8 embodiment typically comprises from 40% to 50% of the airfoil total chordwise length. The forward nonflap/panel portion of a principal airfoil constructed in accordance with this invention, accordingly, typically comprises from 50% to 60% of the airfoil total chord length. Similar considerations pertain to the airfoil cross-sectional profile illustrated in FIGS. 9 through 13 as part of a wing airfoil surface developing principal aerodynamic lift. In applications wherein the improved airfoil is utilized for developing attitude stabilization forces, as in the case of canard members 14 and 15, FIG. 1, the forward fixed nonflap/panel portion of the airfoil may be to as little as approximately 25% of the airfoil total chord length. In wing and canard airfoil arrangements in accordance with this invention it is important that there be a significant airfoil portion of conventional profile configuration in combination with and forwardly of the installed lift ejector injectors in order to develop improved lift circulation or super-circulation, particularly during transitional modes of aircraft system flight operation. Under such conditions increased zones and areas of fluid flow stagnation are developed at the underside of the airfoil in regions forward of the lift ejector installation and zones and areas of separated airflow are eliminated or at least significantly minimized at the after underside of the airfoil, thus improving turning of the air over the airfoil trailing edge region. Such techniques produce significantly increased lift at the airfoil, particularly when combined with the flowing of substantial masses of fluid through the installed lift ejector at high thrust augmentation ratios of approximately 1.6 or better and with accompanying high momentum coefficients, in comparison to known V/STOL aircraft system airfoil constructions proposed or disclosed by others.

FIGS. 14 through 19 are provided in the drawings to schematically illustrate the important functional characteristics of representative airfoils 12 through 15 as provided in aircraft 10 for the control of fuselage attitude during various modes of flight operation and also for controlling developed fluid-reaction lift. Since FIGS. 14 through 19 concern control in different directional freedoms, to almost infinite attainable degrees of attitude change, and in different modes of flight operation, the illustrated control systems in aircraft 10 are best shown separately for different basic modes of flight and for different basic freedoms of roll and pitch change. Also, in a typical control system installation utilized with this invention, numerous conventional linkages comprised of connecting rods, push-pull cables, sectors, pulleys, and like force-transmitting mechanical elements are provided to route the command signal or force originated by the aircraft pilot to particular actuators and attached surfaces. In the drawings, however, essentially only representative elements for obtaining particular relative command actuating motions are illustrated in detail. In one aircraft system having an embodiment of the invention generally similar to the FIGS. 4 through 8 scheme, a conventional hydraulic boost actuator controlled linearly by an attached state-of-the-art servo valve mechanism is moved by control system linkage to desired displacement positions. Another type of control system, e.g., a manually-powered, a partially power-boosted, or an electrical "fly by wire" type might be employed in aircraft system 10 as the equivalent of the mechanical linkage/hydraulic actuator arrangements shown in FIGS. 9 and subsequent.

Figure 14:
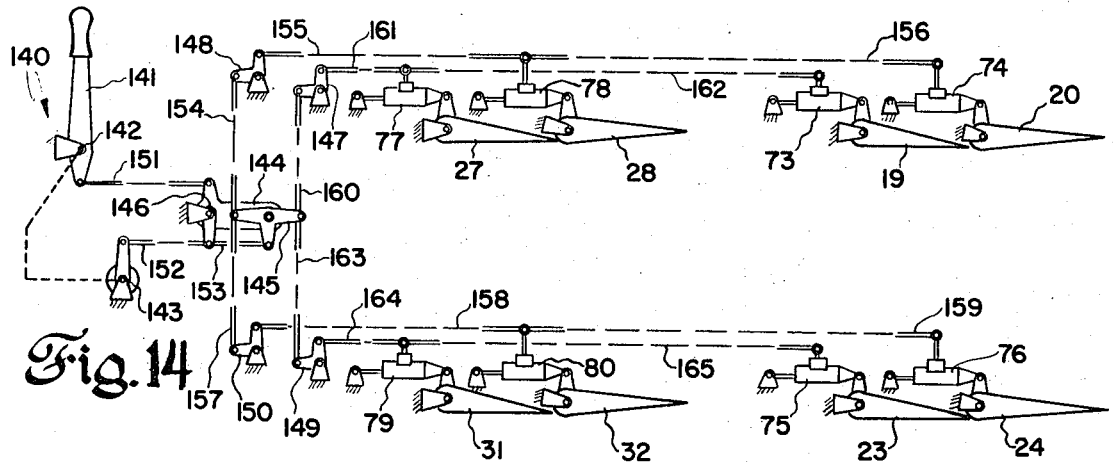
FIG. 14 schematically illustrates the lift mode control system incorporated in the FIG. 1 aircraft system of this application for use in effecting pilot selection of aircraft system mode of flight operation.
Figure 15:
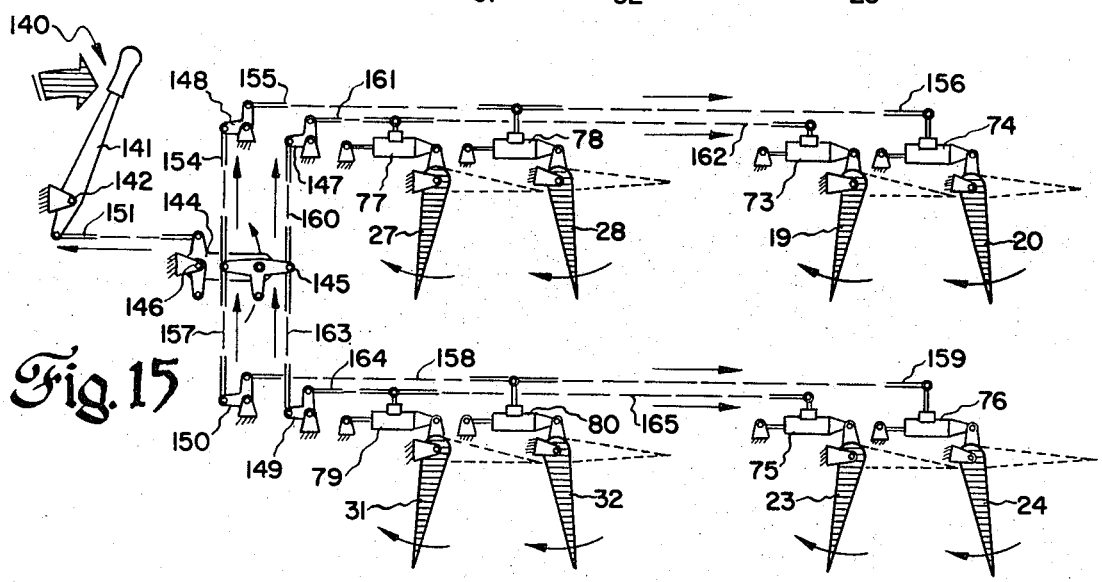
FIG. 15 schematically illustrates the positioning of aircraft system forward and after injector flap members collectively in response to pilot operation of the FIG. 14 lift mode control system to achieve a vertical flight or a hovering flight mode of operation for the FIG. 1 aircraft system.
Figure 16:
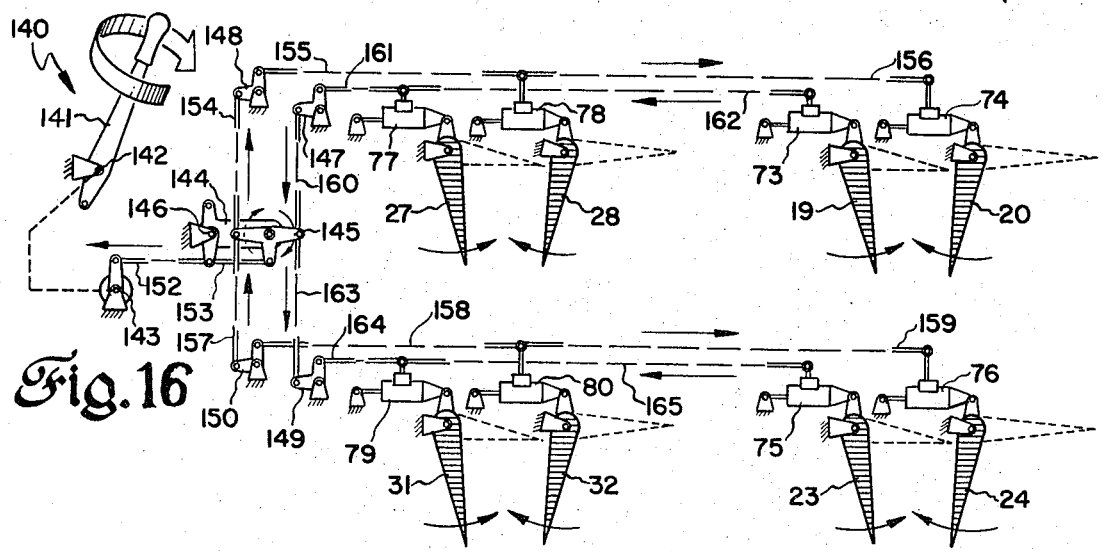
FIG. 16 schematically illustrates the positioning of aircraft system airfoil forward and after injector flap members collectively in response to pilot operation of the FIG. 14 lift mode control system to achieve variation of aircraft system total lift during operation of the FIG. 1 aircraft system in any particular vertical ascent/descent, hovering, or transitional flight mode.
Figure 17:
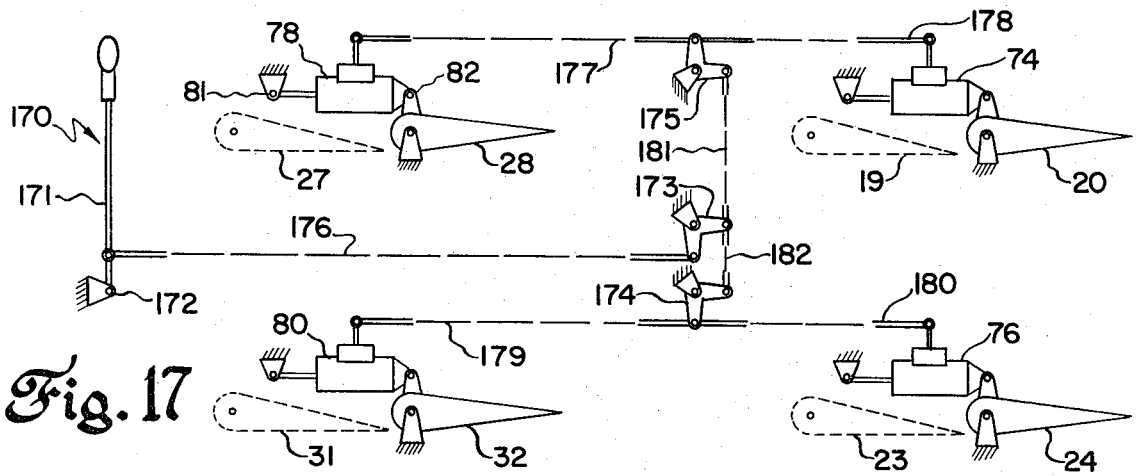
FIG. 17 schematically illustrates the pilot-operated control system incorporated in the FIG. 1 aircraft for controlling lateral attitude during conventional flight modes of operation.

FIGS. 14 through 16 schematically illustrate that portion of the control system for aircraft 10 which is concerned with thrust vector orientation or selection of mode of flight operation (vertical, transitional, conventional) and additionally with trimming variation of total lift developed during system nonconventional flight operation. As shown in FIG. 14, the different forward and after injector flap members are the same components utilized in the showing of FIGS. 1 and 2. The conventional servo-valved hydraulic actuator devices connected to the illustrated flap members are referenced by the numerals 73 through 80 and each such device is normally pivotally supported at its rod end 81 by airfoil or fuselage structure and pivotally connected at its cylinder or housing end 82 to flap member operating arm or lever fixedly attached to flap member structure as shown in FIG. 17. The illustrated mode selection system is referenced generally as 140 and includes a pilot-operated control 141 mounted for rotation about axes 142 and 143. Rotation of the stick portion of control 141 about axis 142 is for effecting flight mode selection; rotation of the handle or grip portion of control 141 about axis 143 is for effecting system total lift variations. Axis 142 is normally laterally oriented relative to the aircraft longitudinal axis and axis 143 preferably corresponds to the longitudinal axis of stick 141 to permit lift trimming by means of a pilot-originated twisting moment being applied to an attached rotatable handle provided on stick 141.

As shown in the FIG. 14 arrangement control system 140 further includes a composite bellcrank 144, 145 pivotally supported to aircraft structure at axis 146 and additionally bellcranks 147 through 150. Bellcranks 144, 145 are controlled for mode selection purposes by control stick 141 through linkage 151. Bellcranks 144, 145 are controlled for total lift variation purposes from control stick 141 by means of pivotally connected series linkages 152 and 153 moved by twisting moments about axis 143. Right-hand after flap members 20 and 28 are controlled through their respective hydraulic actuators 74 and 78 from bellcrank 144, 145 through pivotally connected linkages designated 154, 155, 156, and associated intermediate bellcrank 148. Similarly, left-hand after flap members 24 and 32 and their respectively connected hydraulic actuators 76 and 80 are controlled from bellcrank 144, 145 through pivotally connected linkages 157, 158 and 159 and associated intermediate bellcrank 150. The aircraft system forward flap members 19, 23, 27 and 31 are also controlled from bellcrank 145 carried by bellcrank 144 but through the right-hand pivotally connected linkages designated 160, 161 and 162 and associated intermediate bellcrank 147 and through the left-hand pivotally connected linkages 163, 164 and 165 and associated intermediate bellcrank 149.

Referring to FIG. 15, afterwards movement of control stick 141 from the illustrated FIG. 15 vertical position associated with conventional flight and about lateral axis 142 to the FIG. 15 position associated with vertical/hovering flight is effective to move all aircraft system 10 included injector flap members at substantially equal rates from their fully-faired position (FIG.

14) to an orientation which directs the force vectors produced by the lift ejectors in the system to produce a vertical flight condition. Control stick 141 at positions intermediate the extremes shown in FIGS. 15 and 16 develops different orientations of transitional flight in which the horizontal components of the fluid-reaction lift forces produced by all operating ejector assemblies are controllably vectored to produce some aircraft system forward flight. The flight forward velocity achieved during system transitional modes of flight operation is essentially determined as a matter of force-time integration. Rotation of control stick 141 about axis 142 in a clockwise direction beyond its FIG. 15 position can be utilized to produce reverse flight during vertical/hovering modes of aircraft operation within permitted limits.

FIG. 16 illustrates the control of aircraft system 10 injector flap members to produce trimming variations in total developed fluid-reaction lift during vertical, hovering, or transitional modes of flight operation. The same linkages described in connection with FIGS. 15 and 16, excepting linkage 151, are employed. As observed in FIG. 16, twisting rotation of control 141 about axis 143 by the pilot will cause movement of linkages 152 and 153 thereby causing rotation of bellcrank 145 about its axis of rotation on bellcrank 144. Twisting moments applied to the handle on control stick 141 in one direction produce reduced divergence angles in all connected lift ejector assemblies to thereby reduce system total lift, and in an opposite direction produce increased divergence angles in all connected lift ejector assemblies to thereby increase system total lift. It should be noted that in the modes of operation disclosed in connection with FIGS. 14 through 16, it is preferred that the principal power plant in aircraft system 10 be operated at substantially constant output power (rotational speed) and at near the accepted level of maximum continuous power output. By coordinated and scheduled operation of fluid flow diverter means 43 in propulsion system 37, increased quantities of high-energy fluid are diverted from the system lift ejector assemblies to engine sections 44, 45 to develop increased conventional propulsion forces as final transitional flight stages approaching conventional flight are reached. In known aircraft system configurations, the zone of after flap positions whereat changes in operation from transitional flight to conventional flight are effected is in the range of approximately 30° to 20° down relative to the conventional flight centered or streamlined position of FIG. 6.

FIG. 17 schematically illustrates lateral flight control system 170 incorporated in aircraft system 10 for use selectively in connection with conventional flight operations. As shown in that illustration pilot-operated control stick 171 pivotally mounted to aircraft structure at 172 controls operation of after injector flap members 20, 24, 28 and 32 independently of forward injector flap members 19, 23, 27 and 31 which remain in a relatively fixed position during aircraft system conventional flight operations. Hydraulic acutators 74, 76, 78 and 80 supported at their rod end 81 by aircraft structure and connected at their cylinder end 82 to an actuating arm on the respective flap members correspond to the like-referenced components described in connection with FIG. 14 through 16. Control system 170 further includes bellcrank members 173, 174, and 175 and pivotally terminated connecting linkages 176 through 182.

Figure 18:
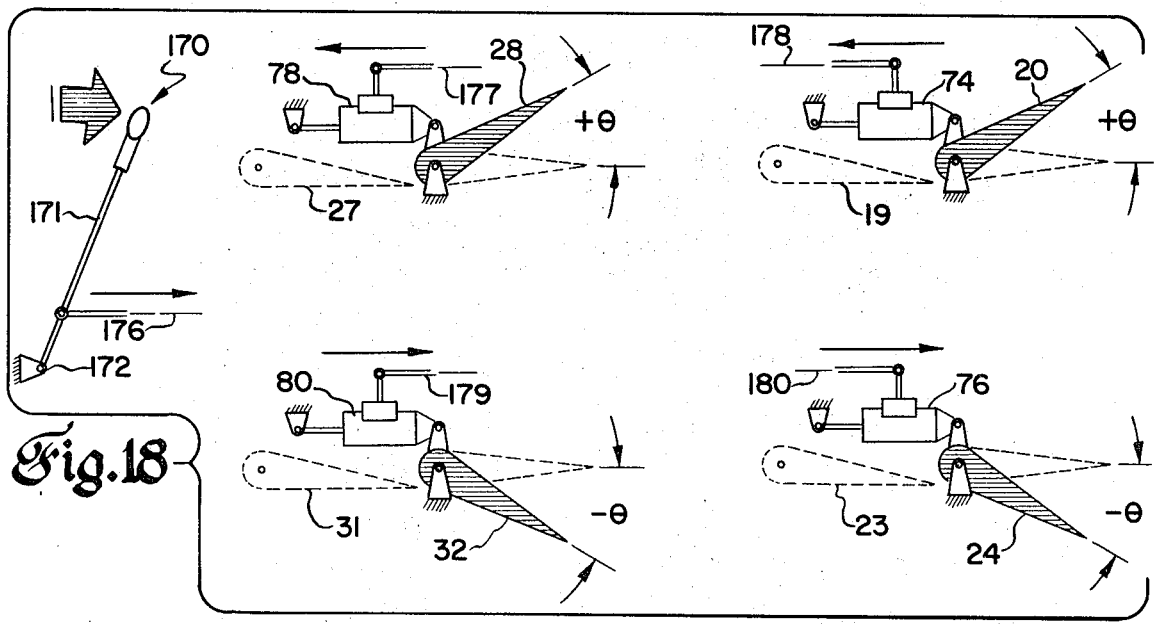
FIG. 18 schematically illustrates the positioning of aircraft system airfoil after injector flap members in response to pilot operation of the FIG. 17 flight control system to achieve a right-roll attitude for the FIG. 1 aircraft system during conventional flight.

Rotation of control stick 171 in a clockwise direction about axis 172 from its FIG. 17 vertical position associated with lateral stabilized flight to its FIG. 18 position for effecting a right-roll change in aircraft lateral attitude produces the changes in position in flap members 20, 24, 28 and 32 illustrated in FIG. 18. Upward rotation of flap members 20 and 28 causes a decrease in the chordwise camber of each of airfoils 12 and 14 and a consequent reduction in the aerodynamic lift produced during conventional flight, and simultaneous clockwise rotation of flap members 24 and 32 increases the chordwise cambers and net vertically upward forces acting on airfoils 13 and 15. Such differential displacement of flap members at opposite sides of the aircraft system longitudinal axis is effective to induce a right-roll change in aircraft attitude by creating a rolling moment about the aircraft longitudinal axis. Rotation of control stick 171 counterclockwise from its FIG. 17 position and about axis 172 is effective to cause left-roll changes in the lateral attitude of aircraft system 10 during conventional flight.

Figure 19:
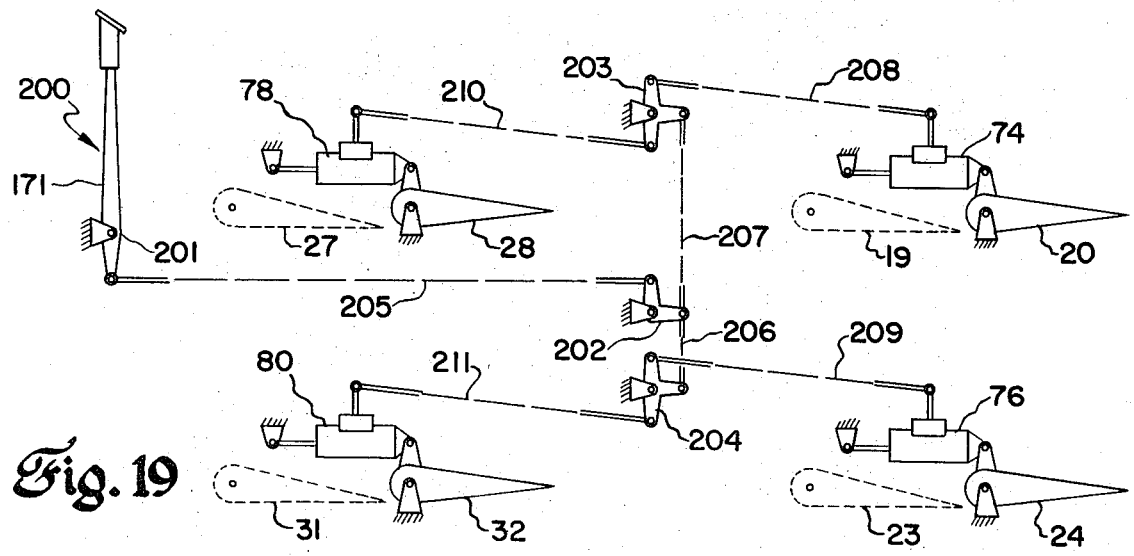
FIG. 19 schematically illustrates the pilot-operated control system incorporated in the FIG. 1 aircraft for controlling longitudinal attitude during conventional flight modes of operation.
Figure 20:
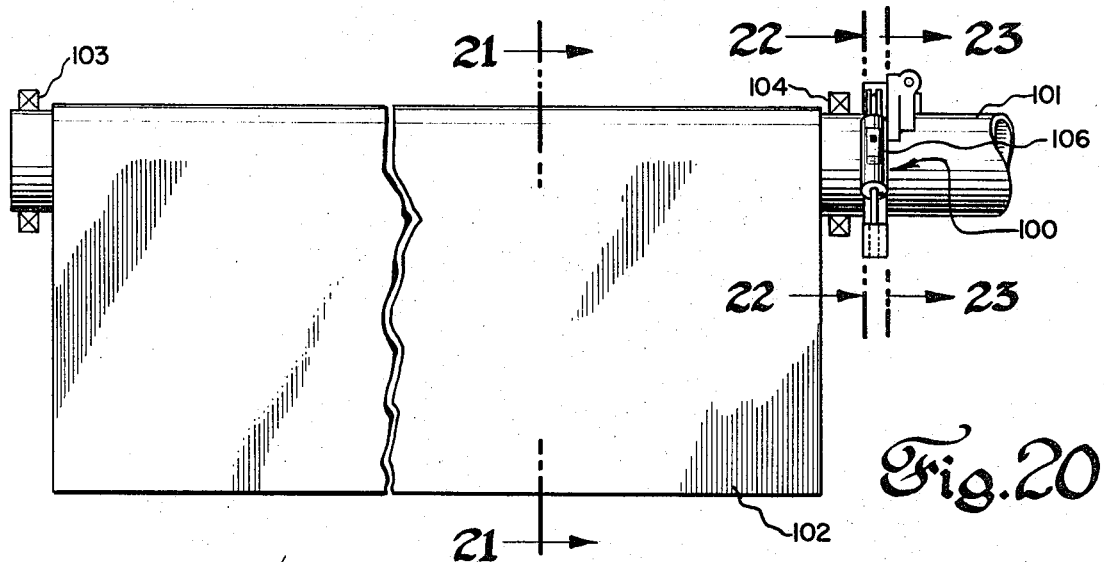
FIG. 20 is an elevational view of a representative after flap member installed in the airfoil of this invention.
Figure 21:
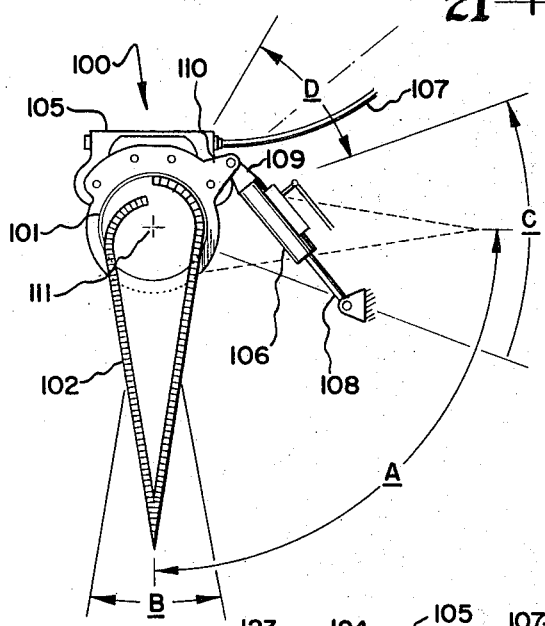
FIG. 21 is a sectional view taken at line 21—21 of FIG. 20.

FIG. 19 details longitudinal flight control system 200 provided in aircraft 10 for use to control airframe longitudinal (pitch) attitude in connection with conventional flight operations. Control stick 171 is pivotally supported by fuselage structure for rotation about additional axis 201 and is rotatable forward and after of the FIG. 19 vertical position to obtain nose-down and nose-up changes in aircraft pitch attitude, respectively. Such changes are accomplished through actuation of hydraulic actuators 74, 76, 78 and 80 and their respectively connected after injector flap members 20, 24, 28 and 32. The means connecting control stick 171 to such hydraulic actuators is essentially comprised of bellcranks 202, 203, and 204 and coupling linkages 205 through 211. Rotation of stick 171 counterclockwise about axis 201 from its FIG. 22 vertical position to produce a nose-down change in aircraft attitude is effective to cause counterclockwise upward rotation of after injector flap members 28 and 32 and consequent chordwise camber decrease in airfoils 14, 15 and to cause clockwise downward rotation of after injector flap members 20 and 24 and consequent chordwise camber increase in airfoils 12, 13. Such rotation of flap members increases the total upward forces acting on principal airfoils 12 and 13 and reduces the lift produced conventionally at airfoils 14, 15. Such combined increased upward forces on the principal airfoils (12, 13) and reduced lift on the canard airfoils (14, 15) produces a turning moment about the aircraft system center of gravity sufficient to re-orient the flight direction of system 10 to a nose-down condition relative to FIG. 19 stabilized longitudinal flight. Rotation of control stick 171 clockwise about axis 201 and relative to its FIG. 19 vertical position is effective to produce an opposite turning moment to reorient the flight direction of system in conventional flight to a nose-up condition relative to FIG. 19 stabilized longitudinal flight.

FIGS. 20 through 23 are provided in the drawings to illustrate an assembly that may be utilized advantageously to rotate the typical after injector flap member included in the airfoil of this invention in the previously discussed different modes of aircraft system flight operation. Such actuator assembly, designated 100 in the drawings, cooperates with fluid duct 101 connected to representative after flap member 102 and rotationally supported by bearing assemblies 103 and 104. Actuator assembly 100 is basically comprised of a gear box 105, a connected conventional linear hydraulic actuator 106 (FIG. 21), and a rotary drive 107. Hydraulic actuator 106 is of conventional closed servo loop design and is pivotally connected at its rod end 108 to an aircraft system airfoil or fuselage structure and at its body end 109 to the attachment clevis 110 on gear box 105. Extention and retraction of the rod of actuator 106 within its body portion causes rotation of duct 101, flap member 102, and gear box 105 about the flap axis designated 111, normally throughout a comparatively limited angular range and at comparatively high rates of rotation. Rotation of drive 107, normally in the form of a flexible drive cable, relative to the housing of gear box 105 is effective to rotate duct 101 and connected flap 102 relative to the gear box, normally throughout a comparatively extended angular range and at a comparatively reduced rate of rotation. More specifically, flap member 102 is typically rotated throughout the angle A shown in FIG. 21 in response to rotation of drive member 107. The rotation of flap member 102 and gear box 105 in response to actuation of linear hydraulic actuator 106 is throughout an angular range such as B or C in FIG. 21. Angle D of FIG. 21 corresponds to angle B or C as the case may be and is the range of rotation of clevis 110.

In relation to the control systems of FIGS. 14 through 19, linear actuator 106 is operated in response to movement of control member 171 about either of axes 172 or 201 or of control member 141 about axis 143. Rotation of flap member 102 by means of the drive 107 force input to gear box 105 is in response to movement of control member 141 about axis 142. The difference in rates of rotation of flap 102 produced as a result of operation of actuator 106 or drive cable 107 is typically of an order of magnitude. Thus flap member 102 may be operated at an angular rate of 30° per second by actuator 106 in comparison to a rate of 3° per second as a result of rotation of drive 107. The drive motor utilized to rotate drive 107 in response to rotation of control member 141 about axis 142 and its servo control loop are normally of conventional design and construction and therefore such are not shown in the drawings. It is important to keep in mind that the input movements effected by actuator 106 and drive cable 107 are cumulative or tandem in nature and that flap 102 may be rotated about axis 111 in response to inputs from drive 107 without causing changes in the length of actuator 106 or position of the housing of gear box 105. Details regarding the construction of gear box 105 are illustrated schematically in FIGS. 22 and 23.

Figure 22:
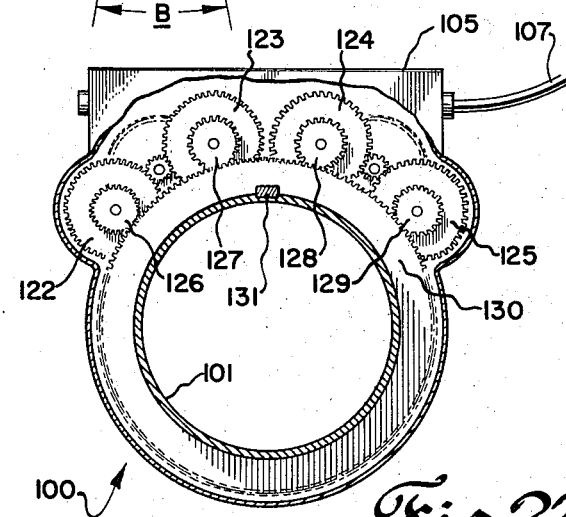
FIGS. 22 and 23 are sectional views taken at lines 22—22 and 23—23, respectively, of FIG. 20 to illustrate details of an actuator and gear box for effecting rotation of the FIG. 20 flap member.
Figure 23:
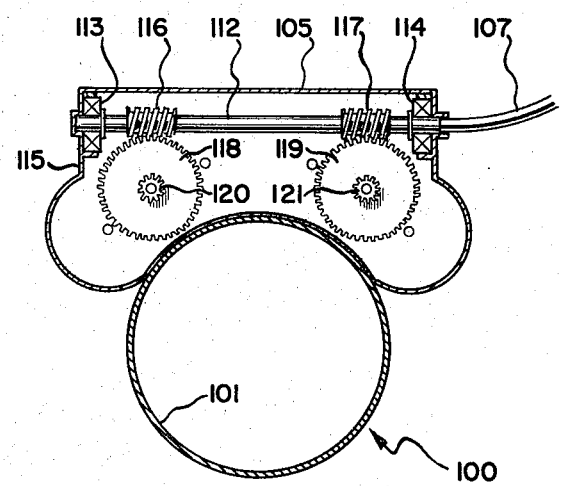

As shown in FIGS. 22 and 23 flexible drive 107 is connected to a shaft 112 supported by bearings 113 and 114. Bearings 113 and 114 are in turn supported by the housing 115 of gear box 105. Shaft 112 is provided with worm gears 116 and 117 and such worm gears engage or mesh with spur gears 118 and 119, respectively. Spur gears 118 and 119 are parts of compound gears and are coupled to reduced-diameter spur gears 120 and 121, respectively. Gear elements 118 through 121 are carried by shafts (not shown) supported by gear box housing 115. Spur gear 120 engages compound gear large diameter gear elements 122 and 123. (FIG. 22). Spur gear 121 engages compound gear large diameter gear elements 124 and 125. Each of gear elements 122 through 125 has a connected reduced diameter gear element (126 through 129) and such reduced diameter gear elements each engage spur gear 130 carried by the exterior surface of duct 101 and coupled thereto by conventional key 131.

I claim:

1. Airfoil means for an aircraft system, comprising:
an airfoil structure having an aerodynamic cross-sectional surface profile producing aerodynamic lift at a predetermined magnitude correlated to an aircraft system attitude-stabilized cruise flight condition;
first airfoil-like primary fluid flow injector means supported by said airfoil structure for rotation throughout an angular range extending from a contained first position defining said airfoil cross-sectional surface profile in part to a projected second position in part defining operating lift ejector throat and diffuser sections producing fluid-reaction lift in an aircraft system non-cruise flight condition;
second airfoil-like primary fluid flow injector means supported by said airfoil structure for rotation independently of said first airfoil-like primary fluid flow injector means and throughout an angular range substantially greater than said first injector means angular range; and
actuator means connected to said second injector means and selectively operable to rotate said second injector means to a projected first position whereat the trailing edge of said second injector means is positioned above the trailing edge of said airfoil structure profile at said predetermined magnitude of aerodynamic lift to substantially reduced the camber of said airfoil cross-sectional profile and thereby reduce said airfoil structure aerodynamic lift to less than said predetermined magnitude and to a projected second position whereat the trailing edge of said second ejector means is positioned below the trailing edge of said airfoil structure profile at said predetermined magnitude of aerodynamic lift and in part defines the lift ejector throat and diffuser sections partially defined by said first injector means, and also to an intermediate contained position whereat said second injector means in part comprises said airfoil structure cross-sectional surface profile producing aerodynamic lift at said airfoil structure aerodynamic lift predetermined magnitude.

2. The airfoil means defined by claim 1 wherein said first and second airfoil-like injector means are respectively supported for rotation about axes at the leading and trailing edges of a lift ejector secondary fluid flow inlet opening defined by said first and second airfoil-like injector means at said projected second positions, said fluid flow inlet opening being positioned generally along the line of centers of aerodynamic pressure of said airfoil structure.

3. The invention defined by claim 2 wherein said first airfoil-like injector means axis of rotation is positioned generally in the range of 25% to 60% of the chord length of said airfoil structure cross-sectional surface profile relative to the leading edge of said profile.

4. The invention defined by claim 1 wherein said actuator means rotates said second injector means throughout an angular range of approximately 125° to 145°.

* * * * *